United States Patent [19]

Muller

[11] Patent Number: 5,615,793

[45] Date of Patent: Apr. 1, 1997

[54] FUEL TANK FILLER PIPE CLOSURE

[75] Inventor: Paul W. Muller, Emsworth, England

[73] Assignee: Britax Wingard Limited, Portchester, England

[21] Appl. No.: 406,069

[22] Filed: Mar. 17, 1995

[30]   Foreign Application Priority Data

Mar. 31, 1994 [GB] United Kingdom .................... 9406499

[51] Int. Cl.⁶ .................................................. B65D 41/06
[52] U.S. Cl. .................. 220/295; 220/86.2; 220/203.06; 220/212.5; 220/301; 220/DIG. 33
[58] Field of Search .................................... 220/295, 297, 220/301, 302, 203.06, 203.07, 203.09, 212.5, 366.1, 86.2, DIG. 33

[56]          References Cited

U.S. PATENT DOCUMENTS

| 3,006,499 | 10/1961 | Corbett . | |
|---|---|---|---|
| 4,436,219 | 3/1984 | Reutter . | |
| 4,887,733 | 12/1989 | Harris | 220/203 |
| 5,108,001 | 4/1992 | Harris | 220/203.06 |
| 5,395,004 | 3/1995 | Griffin et al. | 220/295 |

FOREIGN PATENT DOCUMENTS

| 0252577 | 1/1988 | European Pat. Off. . |
| 0565307 | 10/1993 | European Pat. Off. . |
| 1515873 | 6/1968 | France . |
| 2499520 | 8/1982 | France . |
| 546775 | 7/1942 | United Kingdom . |

*Primary Examiner*—Stephen K. Cronin
*Attorney, Agent, or Firm*—Davis and Bujold

[57]          ABSTRACT

A closure for a fuel tank filler pipe comprises a body carrying a seal at one end for engagement with an outer end of the filler pipe, an outer cover, and a latch member at the other end of the body coupled to the cover and having latching projections for engagement with complementary formations on the filler pipe. A spring biases the latch member towards the outer cover so as to urge the seal into engagement with the end of the filler pipe when the latching projections on the latch member are in engagement with the complementary formations on the filler pipe. The connection between the latch member and the outer cover allows a predetermined range of angular movement of the outer cover relative to the latch member in the unlocking direction before unlocking commences.

18 Claims, 9 Drawing Sheets

FUEL TANK FILLER PIPE CLOSURE

FIELD

This invention relates to a closure for a fuel tank filler pipe of the type comprising a body carrying a sealing formation at one end for engagement with an outer end of the filler pipe, an outer cover, a latch member at the other end of the body having latching projections for engagement with complementary formations on the filler pipe, coupling means connecting the latch member to the outer cover for angular movement therewith while allowing a predetermined amount of relative angular movement between the latch member and the body, and a main spring for causing relative axial movement between the latch member and the body so as to urge the sealing formation into engagement with the end of the filler pipe when the latching projections on the latch member are in engagement with the complementary formations on the filler pipe.

SUMMARY OF THE INVENTION

According to the invention, in a closure of this type, the coupling means includes lost-motion means allowing a predetermined range of angular movement of the outer cover relative to the latch member in the unlocking direction.

DETAILED DESCRIPTION OF THE PREFERRED EMBODIMENTS

Figure 1:
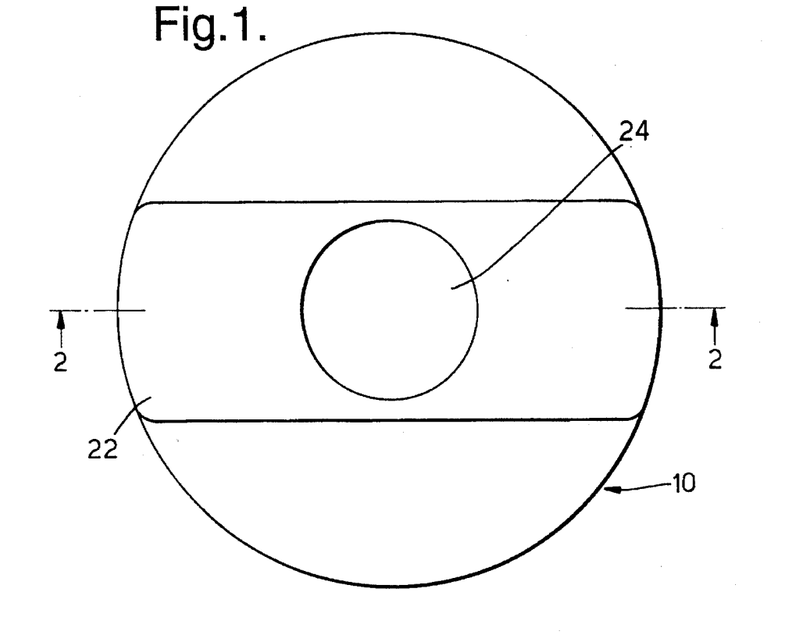
FIG. 1 is a plan view of a fuel tank filler pipe closure in accordance with a first embodiment of the invention, in the orientation for insertion for insertion into and removal from the filler pipe.
Figure 2:
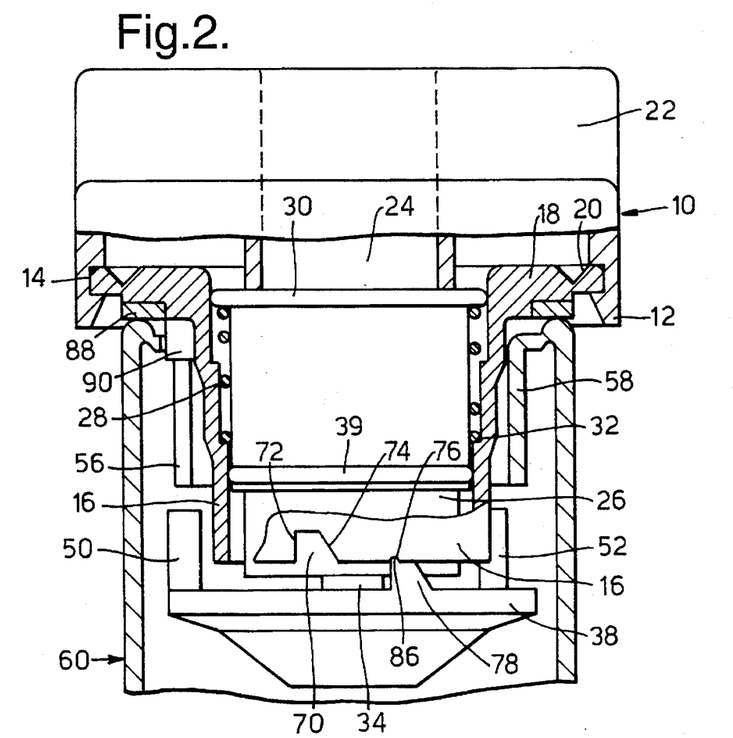
FIG. 2 is a side view of the closure shown in FIG. 1, partially broken away to the line 2—2 in FIG. 1.

Referring to FIGS. 1 and 2, a filler pipe closure comprises an outer cover 10 having a cylindrical skirt 12 with an annular groove 14 in its inwardly facing cylindrical surface. A hollow cylindrical body 16 has an outwardly extending flange 18 on one end, the radially outer edge of which is a sliding fit in the groove 14 so as to allow relative angular movement between the cylindrical body 16 and the cover 10. The flange 18 has an annular zone 20 of reduced thickness to provide a weak point which will break in the event of impact on the cover 10.

As can be seen in FIG. 1, the cover 10 has an upstanding diametrically extending rib 22 which provides a finger grip for effecting angular movement of the closure. In the centre of the rib 22, there is a bore 24 for receiving the barrel of a lock (not shown) which, in its unlocked state couples the cover 10 to a hollow cylindrical sleeve 26.

The sleeve 26 is mounted within the cylindrical body 16 for relative angular movement, and also for relative axial movement against the action of a compression spring 28 which engages between an outwardly projecting flange 30 on the upper end of the sleeve 26 and a shoulder 32 on the inner wall of the body 16. An O-ring seal 39 engages between the abutting surfaces of the body 16 and the sleeve 26 below the shoulder 32.

The lower end of the sleeve 26 has a downwardly projecting stem 34. As can be seen from FIGS. 3, 4 and 6, the stem 34 engages in a central bore 36 in a latch member 38. The bore 36 contains a helical ramp 40 (FIG. 4) which is engaged by a lateral projection 42 on the stem 34. This arrangement allows limited relative angular movement between the sleeve 26 and the latch member 38, accompanied by simultaneous relative axial movement therebetween. On the opposite side to the ramp 40, the bore 36 has an enlarged diameter segment 44 which allows passage of the projection 42 during assembly of the closure but plays no part in subsequent operations.

Figure 3:
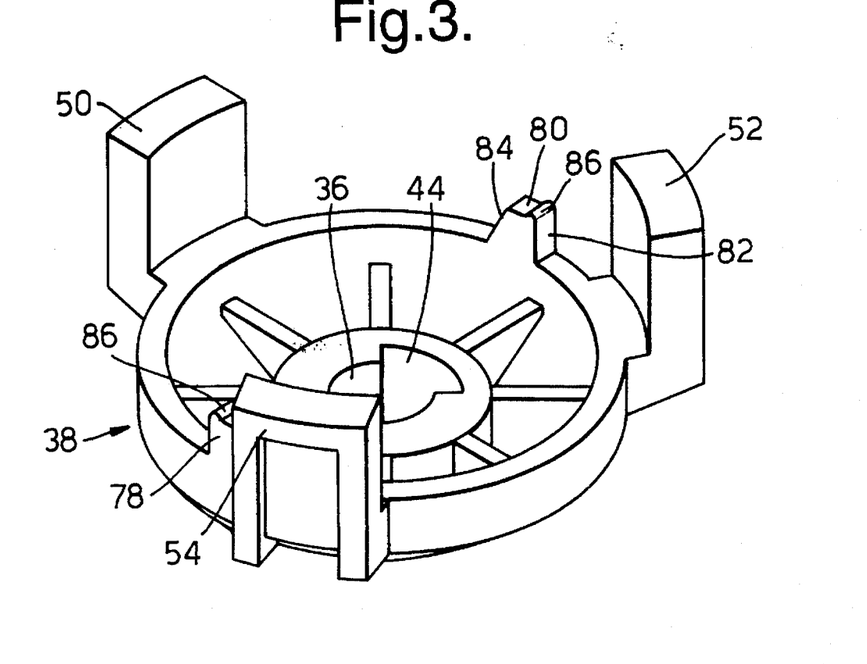
FIG. 3 is a perspective view from above and one side of the latch member of the closure shown in FIGS. 1 and 2.
Figure 4:
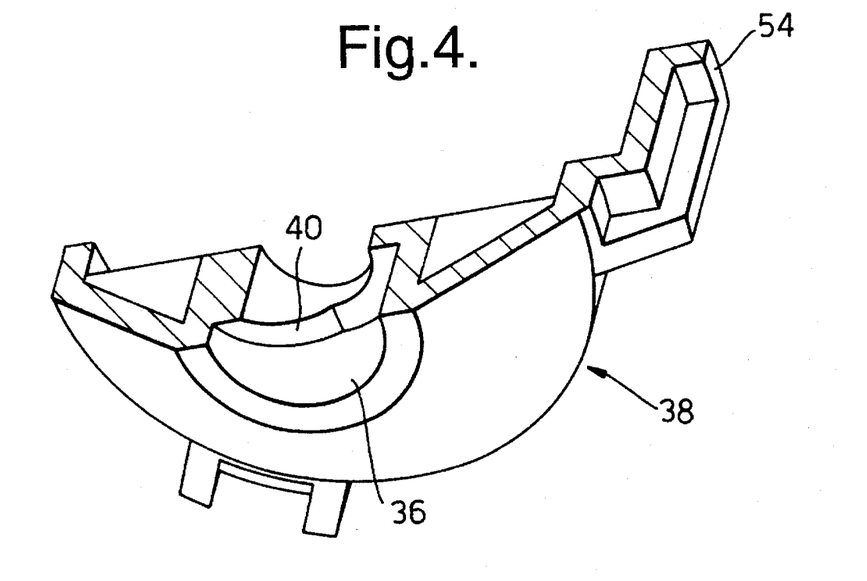
FIG. 4 is a partially broken-away perspective view from below and from the opposite side of the latch member shown in FIG. 3.

As can best be seen from FIG. 3, the latch member 38 has three uniformly spaced latching projections 50, 52 and 54 adapted to pass through respective slots 56 in a flange 58 formed on the outer end of a filler pipe 60 (see FIG. 2).

Figure 7:
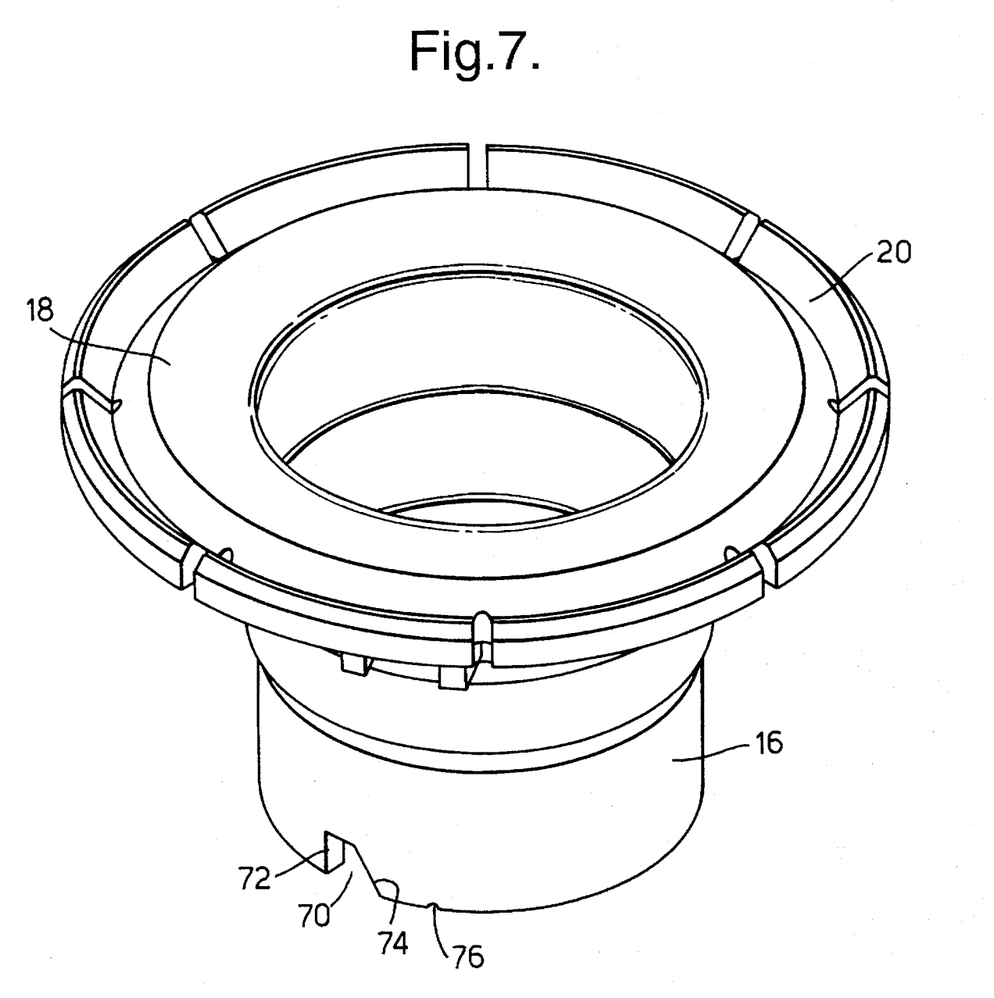
FIG. 7 is a perspective view of the body of the closure shown in FIGS. 1 and 2.

Referring to FIGS. 2 and 7, the body 16 has a pair of diametrically opposed slots 70 in its bottom edge, each of which has a perpendicular face 72 at one end and a ramp 74 at the other end. Beyond the ramp 74 of each slot 70, the bottom edge of the body 16 also has a respective semi-circular notch 76. As can be seen from FIG. 2, the locking member 38 has a corresponding pair of diametrically opposed projections 78 and 80 of the same general cross-section as the slots 70, each having a perpendicular face 82 corresponding to the face 72 and a ramped face 84 corresponding to the ramp 74. Adjacent to the perpendicular face 82, each of the projections 78 and 80 also has a protuberance 86 of the same general cross-section as the notches 76.

FIGS. 1 and 2 illustrate the mechanism of the closure in the position for insertion into the pipe 60. As the closure is inserted, the locking projections 50, 52 and 54 on the latch member 38 move down their respective slots 56 in the filler pipe flange 58 to the position shown in FIGS. 2 and 3, in which an annular seal 88 on the flange 18 engages with the end of the filler pipe 60. Respective webs 90 on the cylindrical body 16 engage in the outer ends of each of the slots 56 to prevent angular movement of the body 16 relative to the filler pipe 60, thereby avoiding any risk of abrasion of the seal 88. At this stage, the projections 78 and 80 on the locking bar have their protuberances 86 received in the notches 76 in the bottom end of the body 16. This holds the sleeve 26 in a downward position relative to the body 16 against the action of the compression spring 28. The flange 30 is therefore below the level of the flange 18 and the bottom of the sleeve 26 is below the bottom edge of the body 16.

Figure 5:
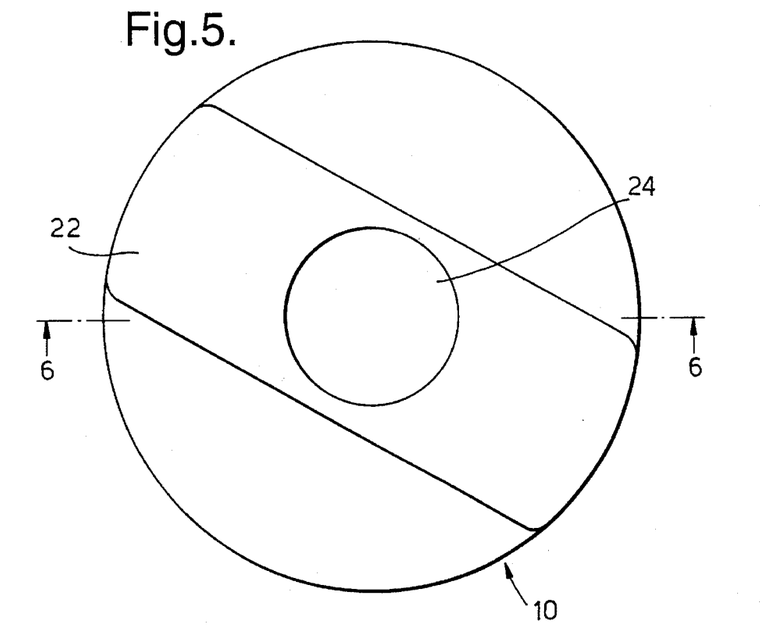
FIG. 5 is a plan view of the closure shown in FIGS. 1 and 2 in the engaged position.
Figure 6:
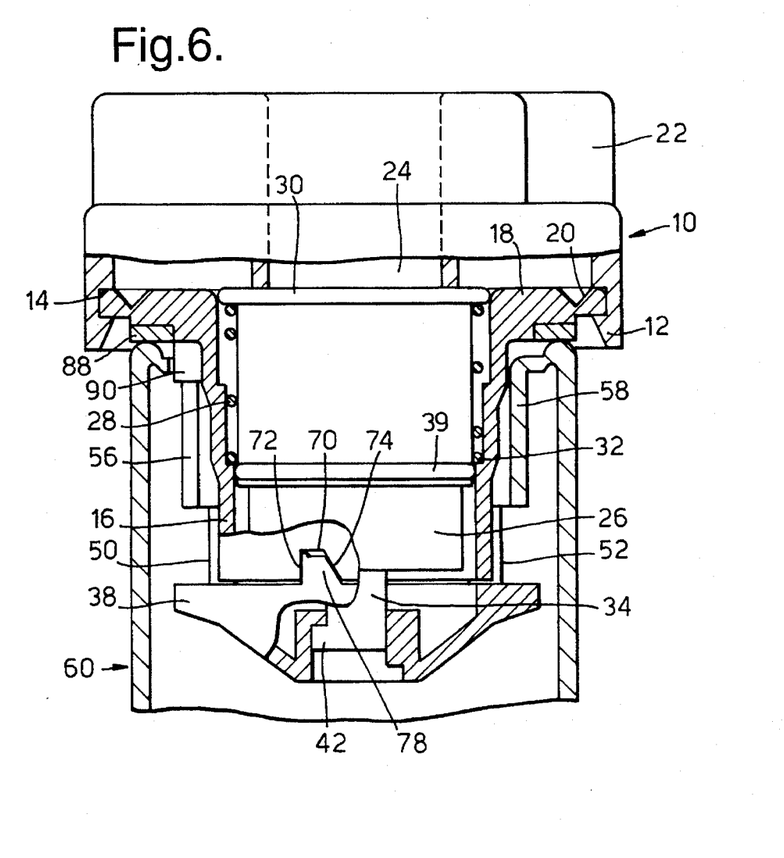
FIG. 6 is a side view similar to FIG. 2, partially broken away to the line 6—6 in FIG. 5.

Next the cover 10, and with it the sleeve 26, are turned 30° in the clockwise direction from the position shown in FIGS. 1 and 2 to the position shown in FIGS. 5 and 6. The latch member 38 turns with the sleeve 26 because the projection 42 is already at the clockwise end of the ramp 40. During this movement, the protuberances 86 on each of the projection 78 and 80 on the latch member 38 disengage from the notches 76 and the projections 78 and 80 move into alignment with respective slots 70, allowing the compression spring 28 to raise the sleeve 26 relative to the body 16, urging the latch projections 50, 52 and 54 firmly into engagement with the flange 58 of the filler pipe 60. The closure is now in its fully closed position with the seal 88 held in engagement with the end of the filler pipe 60. In the event of impact on the cover 10, for example during an accident, the flange 18 on the body will break along the line of the groove 20 and the compression spring 28 will absorb inward movement of the cover 10, thereby preventing the impact from imposing an excessive load on the filler pipe 60.

Figure 8:
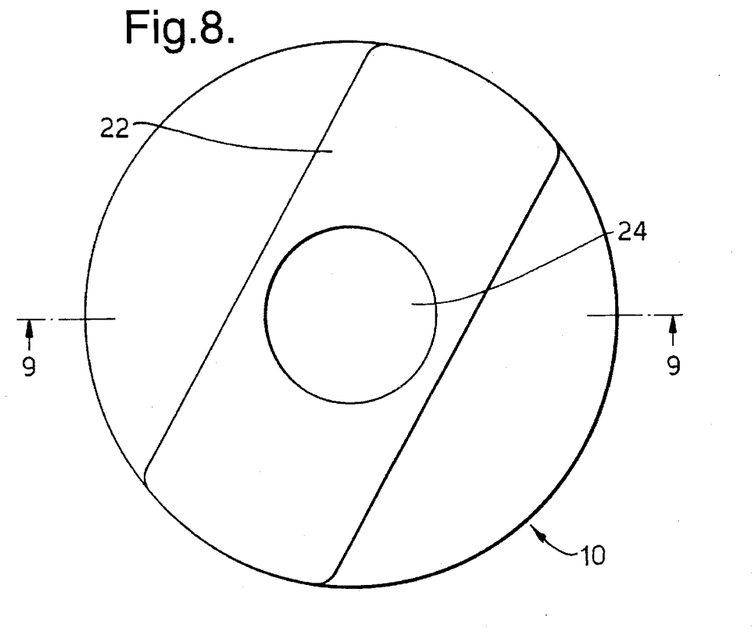
FIG. 8 is a plan view of the closure shown in FIGS. 1 and 2, still in the engaged position but with the closure turned to an orientation to take up backlash prior to disengagement.
Figure 9:
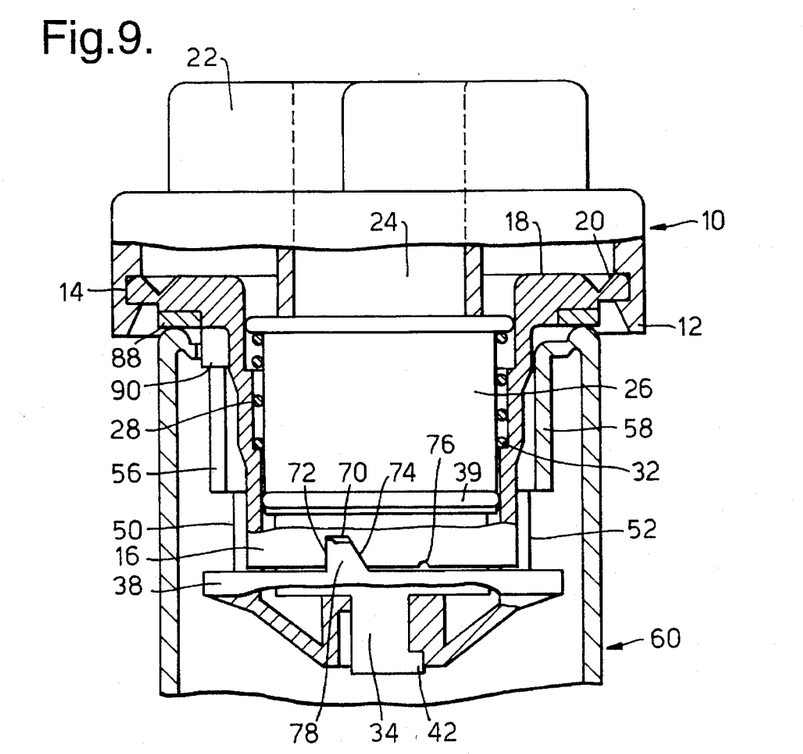
FIG. 9 is a side view similar to FIG. 3, partially broken away to line 9—9 in FIG. 8.

When the closure is to be removed, the cover 10 is first turned through 90° in the counter-clockwise direction from the position shown in FIGS. 5 and 6 to the position shown in FIGS. 8 and 9. The corresponding angular movement of the sleeve 26 relative to the latch member 38 (which remains stationary) causes the projection 42 on the stem 34 to travel down to the counter-clockwise end of the helical ramp 40 on the latch member 38. Since the projections 50, 52 and 54 on the latch member 38 are still in engagement with the locking surfaces on the filler pipe 60, the sleeve 26 is pulled downwardly, compressing the spring 28.

Figure 10:
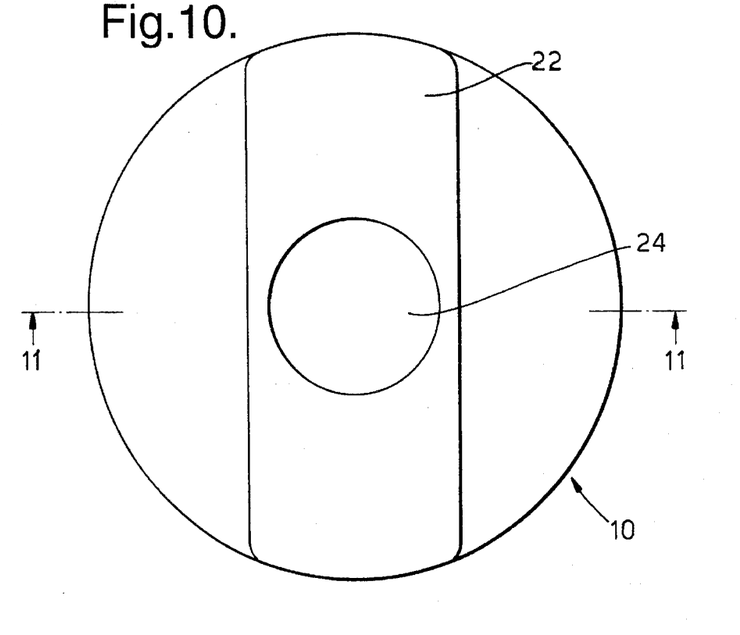
FIG. 10 is a plan view of the closure shown in FIGS. 1 and 2 with the latch fully disengaged so that the closure is free to be removed.
Figure 11:
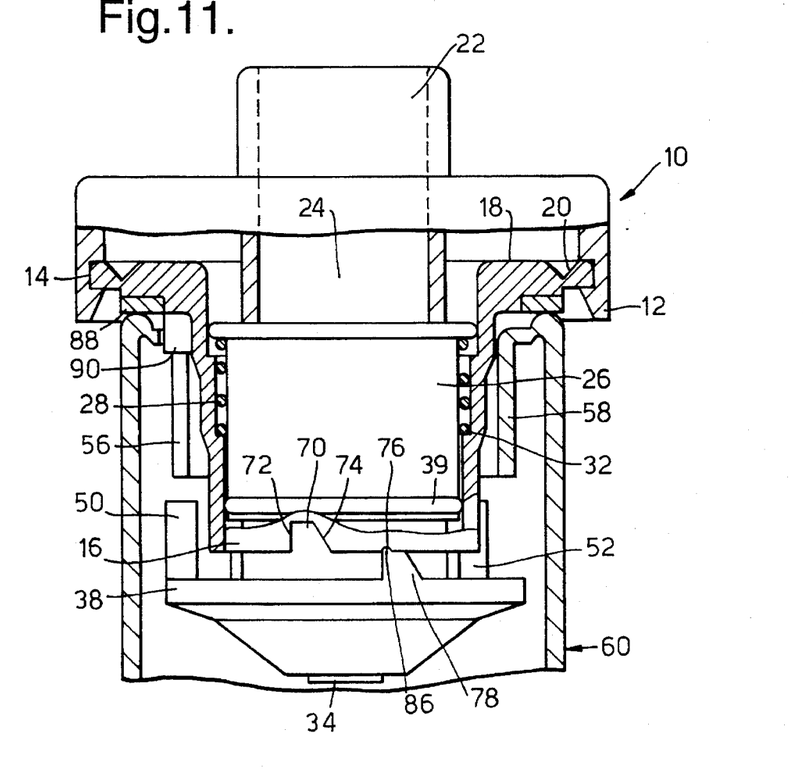
FIG. 11 is a side view similar to FIG. 3, partially broken away to line 11—11 in FIG. 10.

At this stage, if the cover 10 is released, the mechanism springs back to its fully engaged position as shown in FIGS. 5 and 6. On the other hand, if angular movement in the counter-clockwise direction is continued for a further 30° from the position shown in FIGS. 8 and 9 to the position shown in FIGS. 10 and 11, the ramp surfaces 74 and 84 on the slots 70 and the projections 78, 80, ride over one another, thus pushing the latch member downwardly out of engagement with the filler pipe 60 and then moving it in a counter-clockwise direction to bring the latch projections 50, 52 and 54 back into alignment with the slots 70. The closure can now be removed from the filler pipe 60. As soon as the cover 10 is released, the spring 28 forces the projection 42 back along the helical ramp 40, restoring the mechanism to its original position as illustrated in FIGS. 1 and 2.

Figure 12:
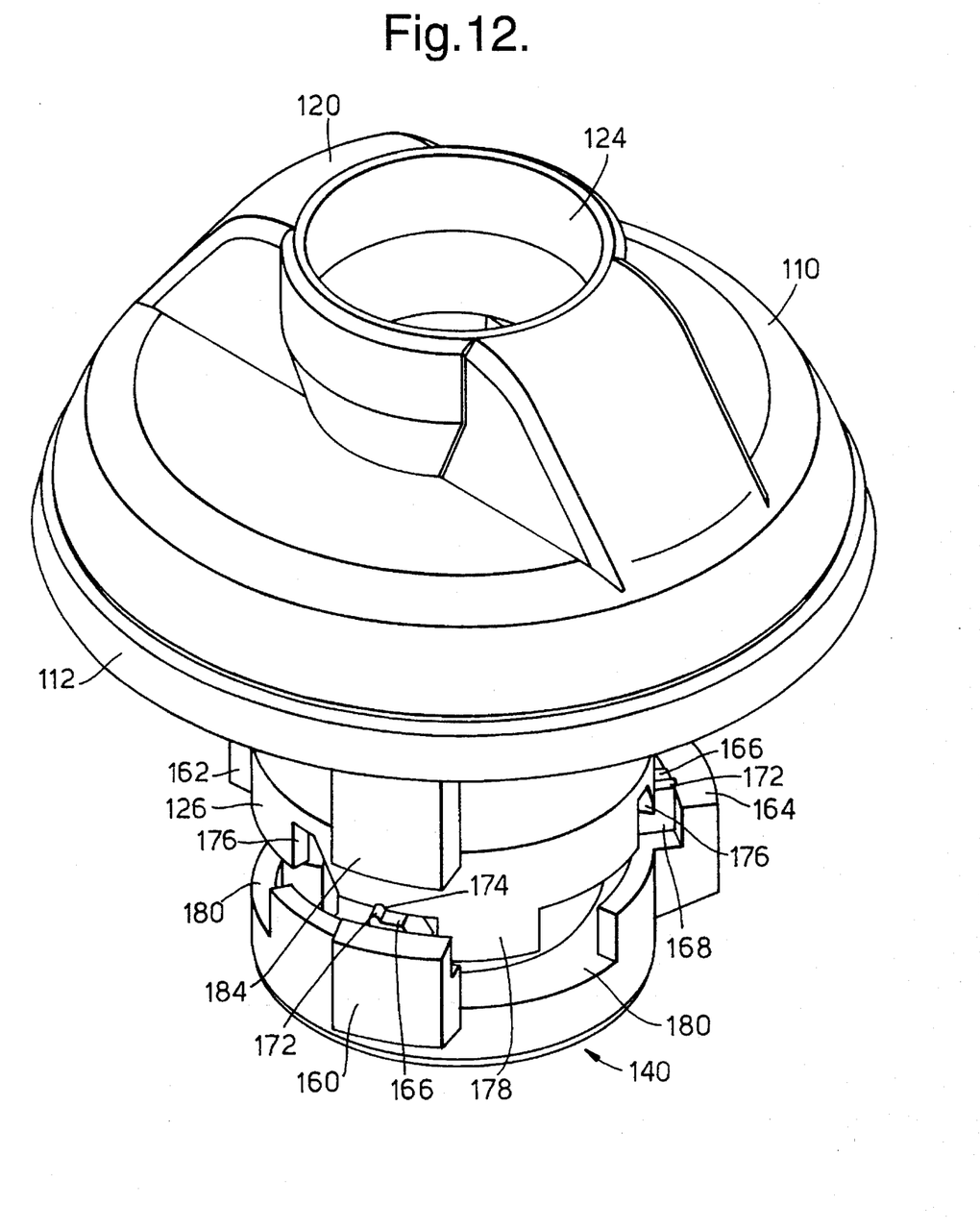
FIG. 12 is a perspective view of a fuel tank filler pipe closure in accordance with a second embodiment of the invention, in the orientation for insertion for insertion and removal from the filler pipe.
Figure 13:
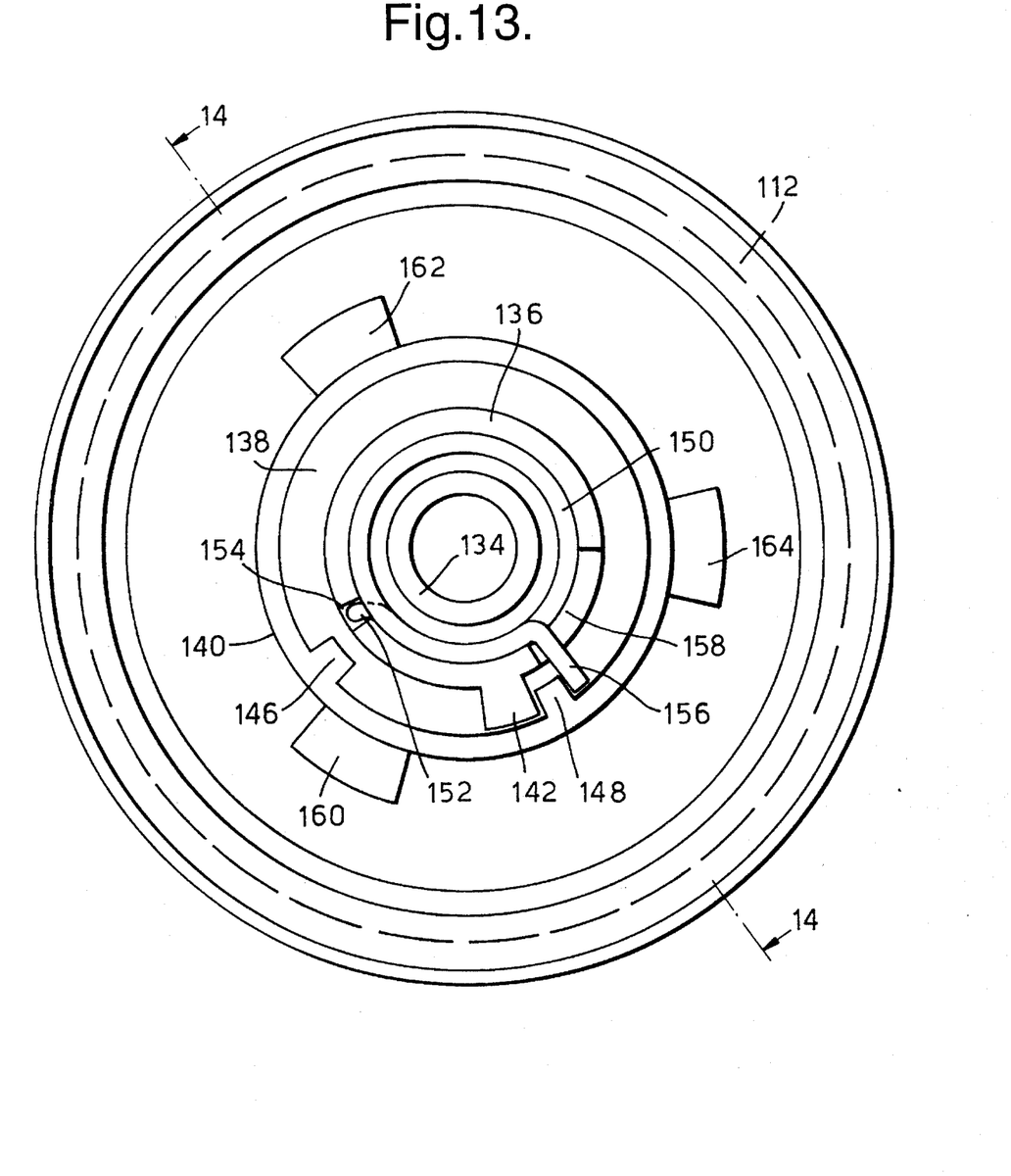
FIG. 13 is a plan view from below of the closure shown in FIG. 12.
Figure 14:
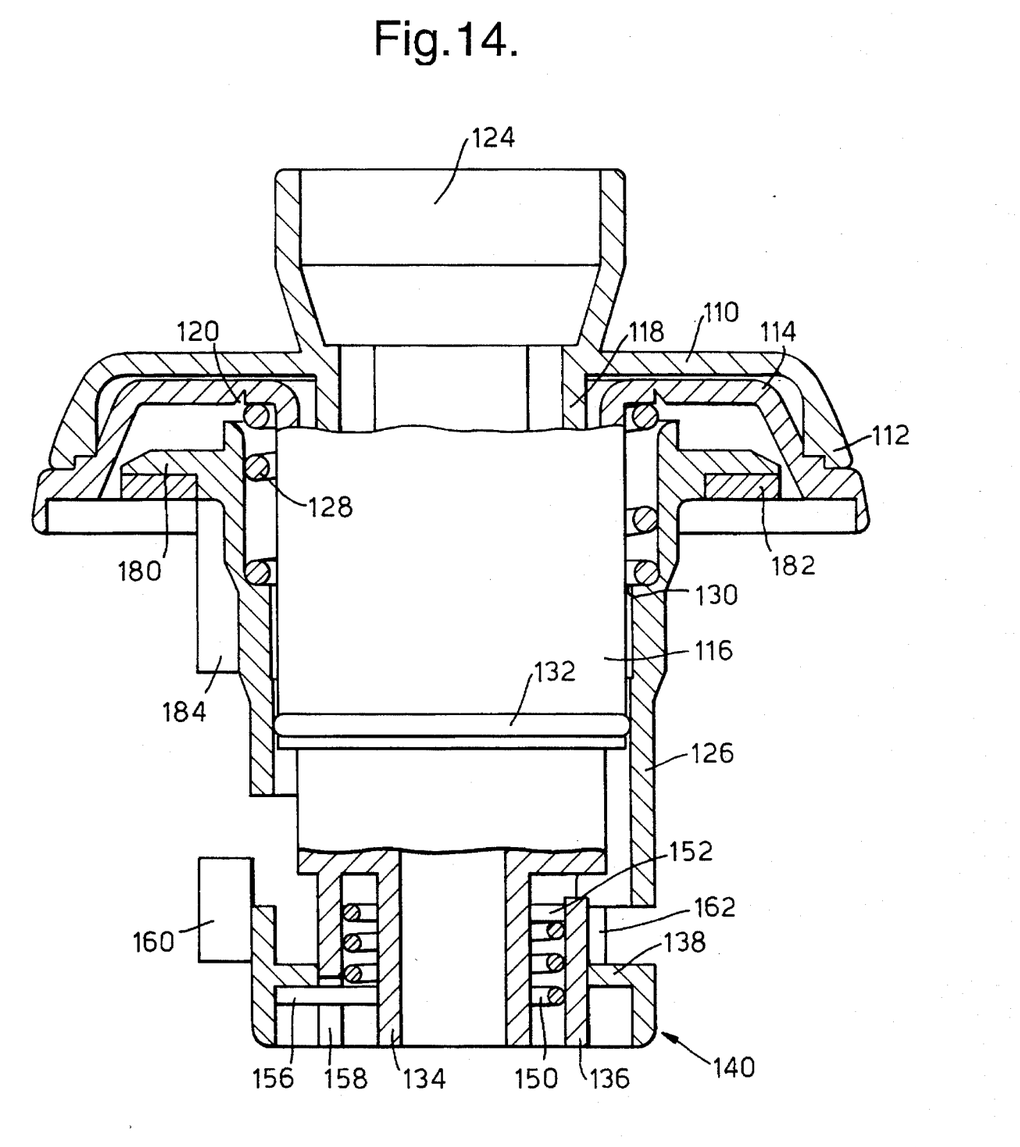
FIG. 14 is a side view of the closure shown in FIGS. 12 and 13, partially broken away on the line 14—14 in FIG. 13.

FIGS. 12 to 14 show a modified filler pipe closure comprising an outer cover 110 having a cylindrical skirt 112 secured to outwardly extending flange 114 on a sleeve 116 having a non-circular internal cross-section. The cover 110 has a hollow stem 118 with a non-circular external cross-section which is received as a sliding fit in the sleeve 116 so as to rotationally couple the latter to the cover 110. Relative axial movement is resisted by the flange 114 which has an annular zone 120 of reduced thickness to provide a weak point which will break in the event of impact on the cover 110.

As can be seen in FIG. 12, the cover 110 has an upstanding diametrically extending rib 122 which provides a finger grip for effecting angular movement of the closure. In the centre of the rib 122, there is a bore 124 leads into the interior of the stem 118 for receiving the barrel of a lock (not shown) which, in its locked state couples the cover 110 to a hollow cylindrical body 126.

Referring to FIG. 14, the sleeve 116 is mounted within the cylindrical body 126 for relative angular movement, and also for relative axial movement against the action of a compression spring 128 which engages between the flange 114 on the upper end of the sleeve 116 and a shoulder 130 on the inner wall of the body 116. An O-ring seal 132 engages between the abutting surfaces of the body 126 and the sleeve 116 below the shoulder 132.

The lower end of the sleeve 116 has two downwardly projecting concentric hollow stems 134 and 136. The outer stem 136 is engaged by an inwardly directed flange 138 on a latch member 140. A radially projecting rib 142 on the outer stem 136 extends between abutment stops 146 and 148 on the latch member 140 located below the flange 138 so as to limit relative angular movement between the sleeve 116 and the latch member 140 to about 90°. The annular space between the inner and outer stems 134 and 136 accommodates a spring 150 which has one end 152 received in a slot 154 in the outer stem 136, and the other end 156 projecting through a window 158 in the outer stem 136 into engagement with the stop 148 so as to bias the sleeve 116 and the outer cover 110 in the counter-clockwise direction relative to the latch member 140 (the clockwise direction as viewed from the outside of the outer cover 110).

The latch member 140 is similar to the latch member 38 of FIGS. 1 to 11 in several respects. Firstly it has three uniformly spaced latching projections 160, 162 and 164 adapted to pass through respective slots in a flange formed on the outer end of a filler pipe (similar to the slots 56 in the flange 58 of the filler pipe 60 shown in FIG. 2). Secondly, as can be seen in FIG. 12, it has projections 166 similar to the projections 78 and 80 of FIG. 3, each having a perpendicular face 168 and a ramped face 170. Adjacent to the perpendicular face 168, each of the projections 166 also has a protuberance 172 similar to the projection 86 of FIG. 3.

The bottom edge of the body 126 has complementary similarities with the body 16 of FIGS. 1 to 11, namely notches 174 to receive the protuberances 172 when the closure is in the orientation for insertion into and removal from the filler pipe as shown in FIG. 12, together with slots 176 for receiving the projections 166 when the closure is in its engaged position (corresponding to reception of the projections 78 by the slots 70 in FIG. 9).

However, in contrast to the closure of FIGS. 1 to 11, the body 126 has additional projections 178 which engage with the projections 166 to prevent them from moving beyond the orientation in which the protuberances 172 engage with the notches 174. The latch member 140 has additional recesses 180 to receive the additional projections 178 when the closure is in its engaged position.

At its upper end, the body 126 has an outwardly extending flange 180 carrying a seal 182. Respective webs 184 on the body 126 engage in the outer ends of each of the slots in the filler pipe flange (similar to the slots 56 of FIG. 2) to prevent angular movement of the body 16 relative to the filler pipe 60, thereby avoiding any risk of abrasion of the seal 88.

The sequence of operations during engagement and disengagement of the closure shown in FIGS. 12 to 14 is similar to that described above for the closure shown in FIGS. 1 to 11.

I claim:

1. A closure for a fuel tank filler pipe comprising a body carrying a sealing formation at one end for engagement with an outer end of the filler pipe, an outer cover, a latch member at the other end of the body having latching projections for engagement with complementary formations on the filler pipe, coupling means connecting the latch member to the outer cover for angular movement therewith while allowing a predetermined amount of relative angular movement between the latch member and the body, and a main spring for causing relative axial movement between the latch member and the body so as to urge the sealing formation into engagement with the end of the filler pipe when the latching projections on the latch member are in engagement with the complementary formations on the filler pipe, characterised in that the coupling means includes lost-motion means allowing a predetermined range of angular movement of the outer cover relative to the latch member in the unlocking direction.

2. A closure according to claim 1, further comprising resilient means resisting said angular movement of the outer cover relative to the latch member.

3. A closure according to claim 2, wherein the main spring is arranged to absorb impact on the outer end of the closure.

4. A closure according to claim 2, wherein the coupling means comprises a coupling member mounted within the body for angular and axial movement relative thereto.

5. A closure according to claim 2, wherein the lost-motion means comprises a helical cam surface engaged by a cam follower so that said angular movement of the outer cover relative to the latch member causes a corresponding relative axial movement which is resisted by the main spring.

6. A closure according to claim 5, wherein the main spring is arranged to absorb impact on the outer end of the closure.

7. A closure according to claim 5, wherein the coupling means comprises a coupling member mounted within the body for angular and axial movement relative thereto.

8. A closure according to claim 2, wherein the resilient means comprises an auxiliary spring.

9. A closure according to claim 8, wherein the main spring is arranged to absorb impact on the outer end of the closure.

10. A closure according to claim 8, wherein the coupling means comprises a coupling member mounted within the body for angular and axial movement relative thereto.

11. A closure according to claim 8, further comprising cam formations on the body adapted to cooperate with complementary cam formations on the latch member to cause relative axial movement between the latch member and the body in opposition to the main spring in response to angular movement of the outer cover relative to the latch member in the unlocking direction beyond said predetermined range.

12. A closure for a fuel tank filler pipe comprising a body carrying a sealing formation at one end for engagement with an outer end of the filler pipe, an outer cover, a latch member at the other end of the body having latching projections for engagement with complementary formations on the filler pipe, coupling means including lost-motion means connecting the latch member to the outer cover for angular movement therewith while allowing a predetermined range of angular movement of the outer cover relative to the latch member in the unlocking direction and a predetermined amount of relative angular movement between the latch member and the body, and a main spring for causing relative axial movement between the latch member and the body so as to urge the sealing formation into engagement with the end of the filler pipe when the latching projections on the latch member are in engagement with the complementary formations on the filler pipe, and resilient means resisting said angular movement of the outer cover relative to the latch member, wherein the lost-motion means comprises a helical cam surface formed on the coupling means and engaged by a cam follower formed on the latch member so that said angular movement of the outer cover relative to the latch member causes a corresponding relative axial movement which is resisted by the main spring.

13. A closure for a fuel tank filler pipe comprising a body carrying a sealing formation at one end for engagement with an outer end of the filler pipe, an outer cover, a latch member at the other end of the body having latching projections for engagement with complementary formations on the filler pipe, coupling means including lost-motion means connecting the latch member to the outer cover for angular movement therewith while allowing a predetermined range of angular movement of the outer cover relative to the latch member in the unlocking direction and a predetermined amount of relative angular movement between the latch member and the body, and a main spring for causing relative axial movement between the latch member and the body so as to urge the sealing formation into engagement with the end of the filler pipe when the latching projections on the latch member are in engagement with the complementary formations on the filler pipe, and cam formations on the body adapted to cooperate with complementary cam formations on the latch member to cause relative axial movement between the latch member and the body in opposition to the main spring in response to angular movement of the outer cover relative to the latch member in the unlocking direction beyond said predetermined range.

14. A closure according to claim 13, wherein the main spring is arranged to absorb impact on the outer end of the closure.

15. A closure according to claim 13, wherein the coupling means comprises a coupling member mounted within the body for angular and axial movement relative thereto.

16. A closure according to claim 13, further comprising resilient means resisting said angular movement of the outer cover relative to the latch member.

17. A closure according to claim 13, wherein the lost-motion means comprises a helical cam surface engaged by a cam follower so that said angular movement of the outer cover relative to the latch member causes a corresponding relative axial movement which is resisted by the main spring.

18. A closure according to claim 13, wherein the resilient means comprises an auxiliary spring.

* * * * *